(12) United States Patent
Walker, Jr. et al.

(10) Patent No.: US 7,497,173 B1
(45) Date of Patent: Mar. 3, 2009

(54) SEED PLACEMENT DEVICE

(76) Inventors: Robert M. Walker, Jr., 3620 Homeway Dr., Los Angeles, CA (US) 90008;
Robert M. Walker, Sr., 3620 Homeway Dr., Los Angeles, CA (US) 90008

(*) Notice: Subject to any disclaimer, the term of this patent is extended or adjusted under 35 U.S.C. 154(b) by 305 days.

(21) Appl. No.: 11/499,450

(22) Filed: Aug. 7, 2006

(51) Int. Cl.
*A01C 5/00* (2006.01)
*A01C 5/02* (2006.01)
*A01C 7/00* (2006.01)
*A01C 15/00* (2006.01)
*A01C 1/04* (2006.01)

(52) U.S. Cl. .......................... 111/92; 111/99; 111/199; 111/200; 47/56

(58) Field of Classification Search .................. 111/115, 111/89, 92, 94, 99, 199, 200, 900, 919; 47/56, 47/58.1 R
See application file for complete search history.

(56) References Cited

U.S. PATENT DOCUMENTS 4,442,627 A * 4/1984 Adams et al. .................. 47/56
5,099,772 A * 3/1992 Murray ......................... 111/92
6,920,890 B2 * 7/2005 Sanders et al. ................ 137/12

FOREIGN PATENT DOCUMENTS

CH                518054 A *   3/1972

* cited by examiner

*Primary Examiner*—Christopher J. Novosad
(74) *Attorney, Agent, or Firm*—Albert O. Cota

(57) ABSTRACT

A seed placement device (10) that is comprised of a seeding strip (12) and a boring tool (32). The seeding strip (12) has a multiplicity of equidistant holes (26) extending therethrough, and the boring tool (32) has an upper end (34), a shank (36) and a lower end (38) that terminates in a point (40). The seed placement device (10) is designed to quickly and easily allow a person to place a multiplicity of seeds (90) in the ground (92). Once the seeding strip (12) is placed in a desired location on the ground (92), a person inserts the boring tool (32) through each of the holes (26) and into the ground (92), thus creating a series of equidistant cavities (94), into each of which at least one seed (90) can be placed.

3 Claims, 3 Drawing Sheets

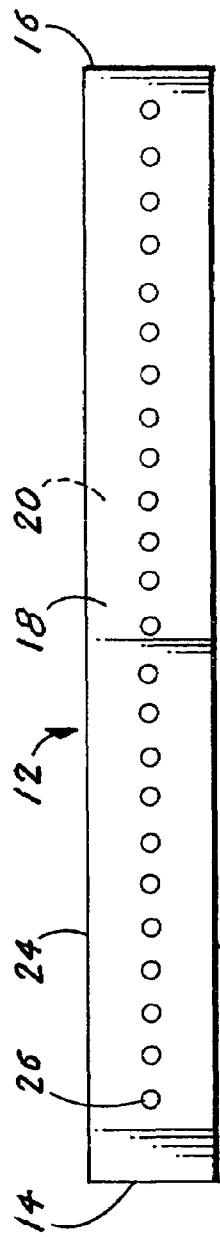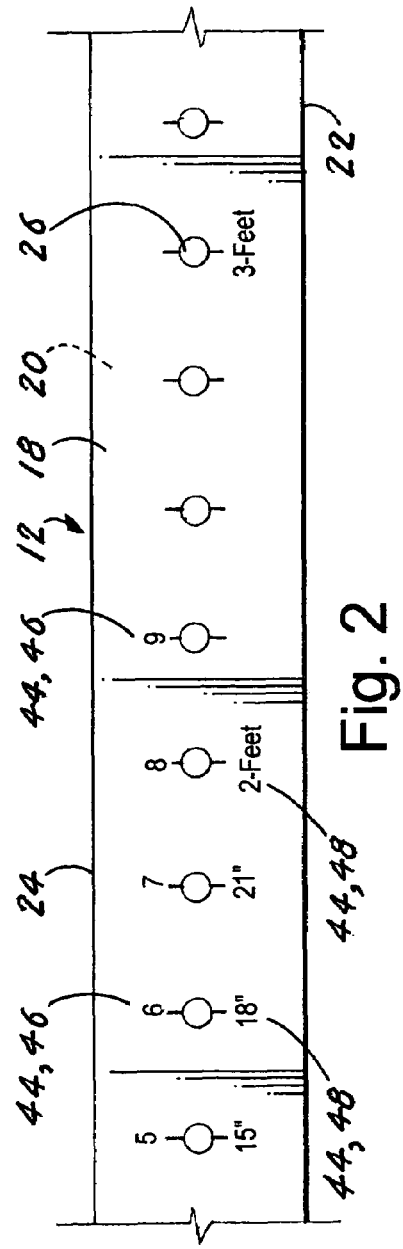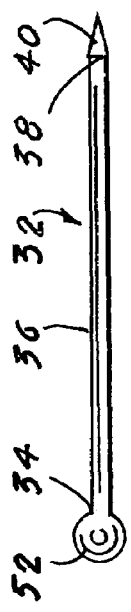

SEED PLACEMENT DEVICE

TECHNICAL FIELD

The invention generally pertains to seeding devices and tools, and more particularly to a seed placement device that enables a person to quickly and easily place a multiplicity of seeds in the ground, at a desired depth and in a straight line at equal intervals.

BACKGROUND ART

One of the oldest activities known to man is gardening, which is the growing and cultivating of plants. Unfortunately, one of the most significant problems that affected gardeners from the beginning is still present: the ability to plant seeds in a uniform, straight line, at the required depth in the ground.

Large commercial and professional plant growing companies do have tools and devices that provide the means by which seeds can be accurately placed at a desired location and depth in the ground. While the tools and devices are effective, they are typically designed to be used for large seeding operations. The tools and devices are also often powered and automatic, which makes them complicated and difficult to use, as well as expensive to purchase.

An individual who wishes to plant a more modest number of seeds, in an area such as a garden or backyard, usually must employ less accurate means of placing seeds. In the worse case scenario, an individual simply uses their eyes to approximate a straight line for the seeds and the proper depth for the seed holes in the ground.

Obviously, there is a significant need for a device that would allow an individual to quickly and easily place a multiplicity of seeds, equidistantly spaced, in a straight line, and at a desired constant depth in the ground. The device must be portable and easily used by a single person. Optimally, the device will be available in various sizes, or multiple devices can be used together for larger seeding applications.

A search of the prior art did not disclose any literature or patents that read directly on the claims of the instant invention.

DISCLOSURE OF THE INVENTION

A seed placement device that is comprised of a seeding strip and a boring tool. The seeding strip has a first end, a second end, an upper surface, a lower surface, a right edge, a left edge, and a multiplicity of equidistant holes that extend through the upper and lower surface. The boring tool has an upper end, a shank, and a lower end that terminates in a point.

The seed placement device is designed to allow a multiplicity of seeds to be placed into the ground at equidistant intervals and at a constant pre-selected depth. By simply placing the seeding strip at a desired location on the ground, and then inserting the boring tool through each of the equidistant holes and into the ground, a multiplicity of cavities are created in the ground. At least one seed can then be placed into each cavity.

The seeding strip includes indicia that shows sequential numbers, thus indicating the number of cavities that have been created and/or seeds that have been placed, and distance markings that indicate how far each of the holes is from a pre-selected location, such as the first end of the seeding strip.

The boring tool includes distance marks that enable a person to determine and choose how deep the cavity in the ground will be. The boring tool can also be designed to include a depth-set sleeve that allows the depth of each cavity to be automatically set.

In view of the above disclosure, the primary object of the invention is to provide a seed placement device that will quickly and easily allow a person to place a multiplicity of equidistant seeds in the ground at a desired constant depth.

It is also an object of the invention to provide a seed placement device that:

can be made in a variety of sizes for various applications, can be easily stored and transported from one location to another, can be easily sold as an all-in-one kit including the device, seeds and instructions for use, can be utilized in schools to teach children about agriculture techniques, allows the seeding strip to be made of a flexible material that can be rolled-up for storage, or a firm, resilient material that can be used for commercial applications, and is cost effective from both a manufacturer's and a consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a top plan view of a seed planting device having a multiplicity of equidistant holes.

FIG. 2 is a partial top plan view of the seed planting device shown with sequential numbers and distance marks that correspond to distances between equidistant holes.

FIG. 3 is a side elevational view of a boring tool having a shank that is dimensioned to fit into the equidistant holes.

BEST MODE FOR CARRYING OUT THE INVENTION

Figure 5:
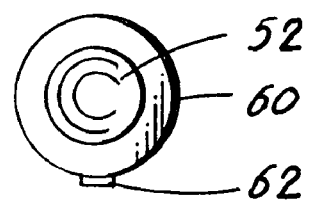
FIG. 5 is a top plan view of the boring tool shown in FIG. 4.

The best mode for carrying out the invention is presented in terms of a preferred embodiment for a seed placement device, (hereinafter the "SPD 10"). the SPD 10, as shown in FIGS. 1-8, is designed to allow a person to quickly and easily place a desired number of seeds 90 in the ground 92. As a result of the SPFs 10 design, the seeds 90 can be placed in a straight line, with all the seeds equidistant from one another. Additionally, the depth at which each seed is placed in the ground can be easily determined. The SPF 10 can be made in various sizes and lengths to accommodate various seeding requirements.

A single SPF 10 can be used by an individual for a home garden, or multiple SPFs 10 can be utilized for professional or commercial seeding operations.

As shown in FIGS. 1-8, the SPF 10 is comprised of two major elements: a seeding strip 12 and a boring tool 32.

The seeding strip 12, as shown best in FIGS. 1 and 2, has a first end 14, a second end 16, an upper surface 18, a lower surface 20, a right edge 22, a left edge 24, and a multiplicity of equidistant holes 26 that extend through the strip's upper surface 18 and lower surface 20.

The seeding strip 12 has a length that can range from 36-inches (91.44 centimeters) to 60-inches (152.40 centimeters), with 48-inches (121.92 centimeters) preferred. Note that the above dimensions apply to a seeding strip that would be used for a typical single person, home/personal garden. For larger professional or commercial seeding applications, a SPF 10 having larger dimensions would be utilized.

The seeding strip 12 is preferably made of a flexible material, such as natural rubber, synthetic rubber and resilient thermal plastic, which allows the strip 12 to be rolled up when not in use. Additionally, a thin metal can also be utilized to fabricate the seeding strip 12. Although a flexible material is preferred, the seeding strip 12 can also be made of a rigid material, such as metal, wood or plastic.

As shown in FIG. 2, the seeding strip 12 further comprises indicia 44 consisting of numbers 46 that are sequentially placed adjacent to each of the equidistant holes 26. The numbers 46 indicate the distance 48 that each of the holes 26, or a selected hole 26, is from a pre-selected location, such as the first end 14 of the seeding strip 12. The sequential numbers 46 and the distance marks 48 can be printed to read longitudinally, as shown in FIG. 2, or alternately to read laterally (not shown).

Figure 4:
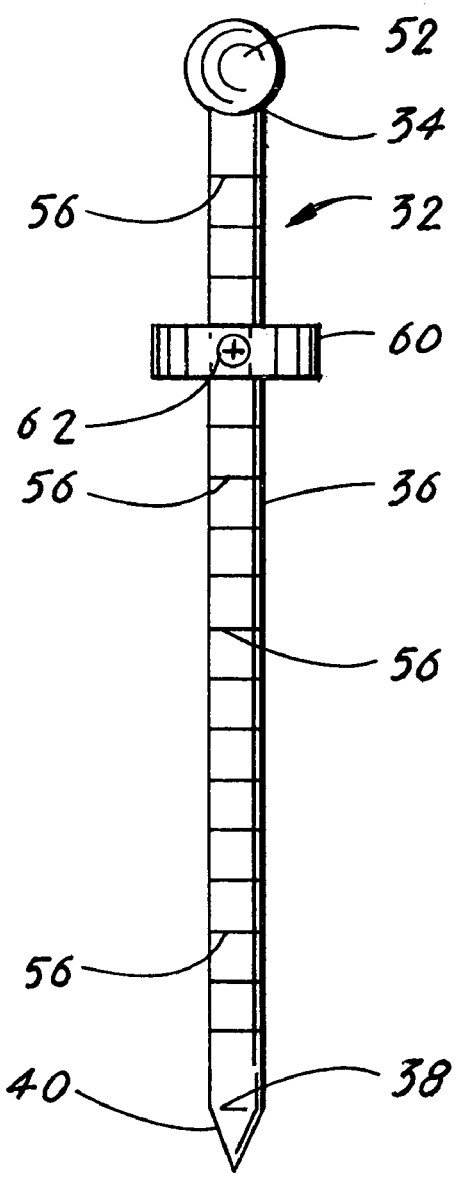
FIG. 4 is a front elevational view of a boring tool that includes a hand grip, depth distance marks and a depth-set sleeve.
Figure 6:
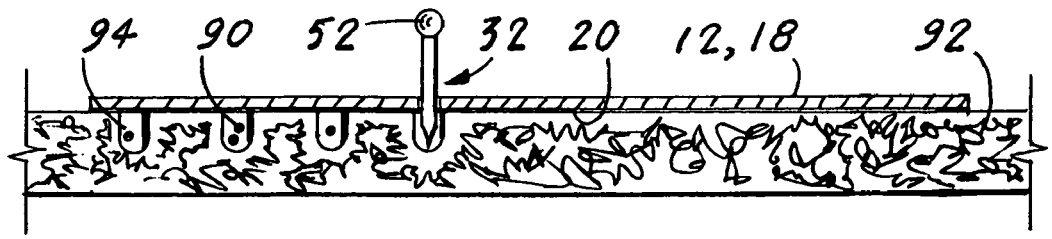
FIG. 6 is a side cross-sectional view of a seeding strip that has been placed on the ground. The figure shows a plurality of cavities with seeds, and a boring tool that has been inserted into the ground to produce a cavity prior to inserting a seed.

As shown best in FIGS. 3, 4 and 5, the boring tool 32 has a upper end 34, a shank 36, and a lower end 38 that terminates in a point 40. The boring tool's 32 shank 36 is dimensioned to have a diameter that allows it to fit through each of the multiplicity of holes 26 on the seeding strip 12. As shown in FIG. 6, the boring tool 32 is inserted through each hole 26 and into the ground 92 to create a cavity 94 in the ground, into which at least one seed 90 is placed.

The boring tool 32 has a length ranging from 10-inches (25.40 centimeters) to 50-inches (127.00 centimeters). The shorter length allows a person to stoop down or be on their hands and knees when inserting the boring tool 32 through the seeding strip 12 and into the ground 92, and the longer length allows a person to be standing when inserting the boring tool 32. Since the boring tool 32 must be able to easily penetrate the ground 92, it is made of a rigid, strong material such as metal, wood or plastic. As shown in FIG. 3, in order to provide a firmer and more comfortable grip on the boring tool 32, a hand grip 52 can be located at the upper end 34 of the tool 32.

The boring tool 32 further comprises a plurality of distance marks 56, as shown in FIG. 4, which indicate how deep the boring tool 32 descends into the ground 92. Additionally, the boring tool 32 can comprise a depth-set sleeve 60, as shown in FIGS. 4 and 5. The depth-set sleeve 60 is designed to slideably fit around the boring tool 32 and be held at a desired depth by a set-screw 62. The depth-set sleeve 60 causes the boring tool 32 to stop at a desired depth when the tool 32 is inserted in the ground 92.

Figure 7:
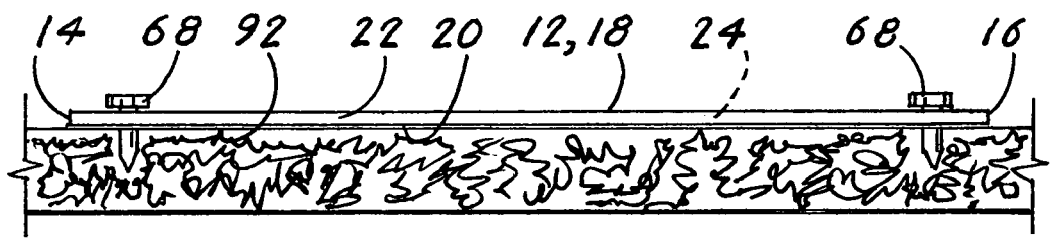
FIG. 7 is a side elevational view of a seeding strip that has been attached to the ground by means of a pair of tie-down stakes.
Figure 8:
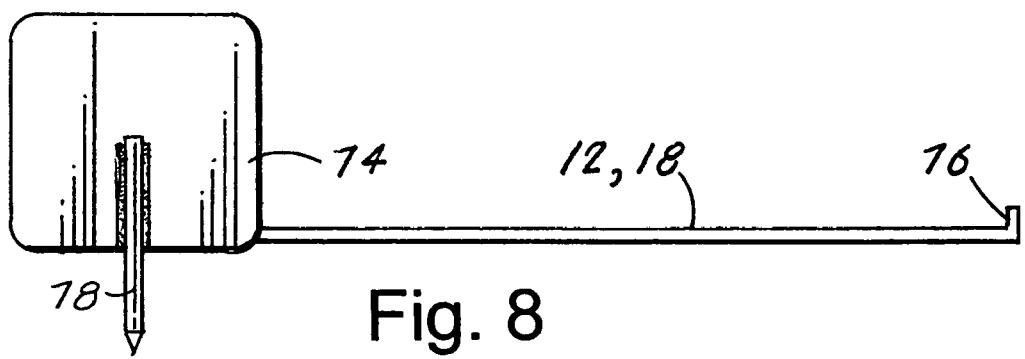
FIG. 8 is a side elevational view of a seeding strip that is enclosed within a spring-loaded housing.

To add further utility to the SPF 10 two additional elements may be utilized. First, at least one tie-down stake 68, as shown in FIG. 7, can be used to maintain the placement of the seeding strip 12 at a desired location on the ground 92. Second, the seeding strip 12 can be retractably inserted into a housing 74, as shown in FIG. 8. The housing 74 has an internal spring-loaded mechanism that allows the seeding strip 12 to be removed from and retracted into the housing in the same manner as a tape measure. As also shown in FIG. 8, when the housing 74 is utilized, the seeding strip 12 has a pull-tab 76 located on the first end 14 for removing the strip 12 from the housing 74.

The housing 74 can also be designed to include a centrally attached stake 78, as shown in FIG. 8, that allows the housing 74 to be rotated. The stake 78 can be fixed, as shown in FIG. 8 or be designed to retract into the housing when the stake is not in use. The rotation of the housing 74 allows the seeding strip 12 to be placed in a plurality of arc segments.

The use of the SPD 10 is simple and is accomplished by performing the following steps:

1. place the seeding strip 12 at a desired location on the ground 92,
2. align the seeding strip 12 to when the seeds 90 are to be placed,
3. insert the boring tool 32 into the first of the multiplicity of equidistant holes 26 located on the seeding strip 12,
4. remove the boring tool 32 when a cavity 94 of desired depth is made in the ground 92,
5. insert at least one seed 90 into the cavity 94 in the ground,
6. repeat steps 3-5 for each of the subsequent holes 26 in the seeding strip 12, and
7. remove the seeding strip 12.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A seed placement device for accurately allowing a multiplicity of seeds to be placed in a straight line, equidistant from one another, and at a pre-selected depth in the ground, wherein said seed placement device is comprised of:

a) a seeding strip having a first end, a second end, an upper surface, a lower surface, a right edge, a left edge, and a multiplicity of equidistant holes extending through the upper and lower surfaces, and b) a boring tool having an upper end, a lower end that terminates in a point, and a shank having a diameter that allows said boring tool to fit through the holes in said seeding strip, wherein said boring tool is inserted through each hole in said seeding strip and into the ground to create a cavity in the ground, into which at least one seed is placed, wherein said boring tool having a depth-set sleeve that slideably fits around said boring tool and can be held at a desired location/depth by a set-screw, wherein the depth-set sleeve causes said boring tool to stop at a desired depth when inserted into the ground.

2. A seed placement device for accurately allowing a multiplicity of seeds to be placed in a straight line, equidistant from one another, and at a pre-selected depth in the ground, wherein said seed placement device is comprised of:

a) a seeding strip having a first end, a second end, an upper surface, a lower surface, a right edge, a left edge, and a multiplicity of equidistant holes extending through the upper and lower surfaces, b) a boring tool having an upper end, a lower end that terminates in a point, and a shank having a diameter that allows said boring tool to fit through the holes in said seeding strip, wherein said boring tool is inserted through each hole in said seeding strip and into the ground to create a cavity in the ground, into which at least one seed is placed, and c) a housing into which said seeding strip can be retracted when not in use or extracted when in use.

3. A seed placement device for accurately allowing a multiplicity of seeds to be placed in a straight line, equidistant from one another, and at a pre-selected depth in the ground, wherein said seed placement device is comprised of:

a) a seeding strip having a first end, a second end, an upper surface, a lower surface, a right edge, a left edge, and a multiplicity of equidistant holes extending through the upper and lower surfaces, b) a boring tool having an upper end, a lower end that terminates in a point, and a shank having a diameter that allows said boring tool to fit through the holes in said seeding strip, wherein said boring tool is inserted through each hole in said seeding strip and into the ground to create a cavity in the ground, into which at least one seed is placed, and c) a housing into which said seeding strip can be retracted when not in use or extracted when in use, wherein said housing comprises a centrally attached stake that allows said housing to be rotated to allow said seeding strip to be placed in a plurality of arc segments.

* * * * *